(12) United States Patent
Kaspar et al.

(10) Patent No.: US 8,697,247 B2
(45) Date of Patent: Apr. 15, 2014

(54) ELECTRICAL PLUG CONTACTS AND A SEMI-FINISHED PRODUCT FOR THE PRODUCTION THEREOF

(75) Inventors: Franz Kaspar, Niefern-Öschelbronn (DE); Joachim Ganz, Mauaeräckerstrasse (DE); Isabell Buresch, Illertissen (DE)

(73) Assignee: Doduco GmbH, Pforzheim (DE)

( * ) Notice: Subject to any disclaimer, the term of this patent is extended or adjusted under 35 U.S.C. 154(b) by 1029 days.

(21) Appl. No.: 10/553,581

(22) PCT Filed: Apr. 17, 2004

(86) PCT No.: PCT/EP2004/004100
§ 371 (c)(1),
(2), (4) Date: Jan. 30, 2006

(87) PCT Pub. No.: WO2004/093256
PCT Pub. Date: Oct. 28, 2004

(65) Prior Publication Data
US 2006/0148339 A1    Jul. 6, 2006

(30) Foreign Application Priority Data
Apr. 17, 2003 (DE) .................... 103 18 890

(51) Int. Cl.
*B23B 5/14*   (2006.01)
*B32B 15/01*  (2006.01)
*H01H 1/023*  (2006.01)
*H01R 13/03*  (2006.01)

(52) U.S. Cl.
USPC ........... 428/610; 428/673; 428/929; 200/265; 200/266; 200/268; 200/269; 439/886; 439/887

(58) Field of Classification Search
None
See application file for complete search history.

(56) References Cited

U.S. PATENT DOCUMENTS

| 4,456,662 A * | 6/1984 | Malikowski et al. ......... 428/632 |
| 4,457,780 A   | 7/1984 | Osada et al. |
| 4,808,223 A   | 2/1989 | Ozaki et al. |

(Continued)

FOREIGN PATENT DOCUMENTS

| DE | 3806573 A1 | 9/1989 |
| DE | 4205763 A1 | 8/1993 |

(Continued)

*Primary Examiner* — Gwendolyn Blackwell
*Assistant Examiner* — Seth Dumbris
(74) *Attorney, Agent, or Firm* — Hackler Daghighian & Martino

(57) ABSTRACT

The invention discloses a semi-finished product for making plug-in contacts in plug-in connectors for electric DC power systems in motor vehicles which are operated at a nominal voltage at which electric arcing may occur, having an electrically conductive main body made of a non-precious metallic material that carries, at least in part, a contact-making coating of a material more precious than the material of the main body. It is provided according to the invention that the coating has thickness of at least 0.3 μm and consists of silver or of a silver-based alloy with an addition that will not form an alloy with silver or with the silver-based alloy, or will at best form a precipitation alloy, and which has a higher melting point than silver.

7 Claims, 1 Drawing Sheet

(56) References Cited

U.S. PATENT DOCUMENTS

| | | | |
|---|---|---|---|
| 5,591,926 A | | 1/1997 | Inada et al. |
| 5,679,471 A | * | 10/1997 | Cheng et al. ............... 428/673 |
| 5,967,860 A | | 10/1999 | Ricketts et al. |
| 6,350,294 B1 | | 2/2002 | Renner et al. |
| 6,755,958 B2 | * | 6/2004 | Datta .......................... 205/191 |
| 7,015,406 B2 | * | 3/2006 | Ganz et al. ................... 200/269 |
| 2001/0024895 A1 | | 9/2001 | Sakiyama et al. |
| 2001/0055697 A1 | * | 12/2001 | Schleicher et al. .......... 428/647 |
| 2004/0238338 A1 | | 12/2004 | Ganz et al. |

FOREIGN PATENT DOCUMENTS

| | | | |
|---|---|---|---|
| DE | 10045783 A1 | | 11/2001 |
| EP | 0311134 A1 | | 10/1988 |
| EP | 0825682 A2 | | 2/1998 |
| JP | 59-153852 | * | 1/1984 |
| JP | 59-153852 | * | 9/1984 |
| JP | 62-58524 A | | 3/1987 |
| JP | 2002-319446 A | | 10/2002 |
| JP | 2003-064432 | | 3/2003 |
| WO | 94/19814 | | 9/1994 |

* cited by examiner

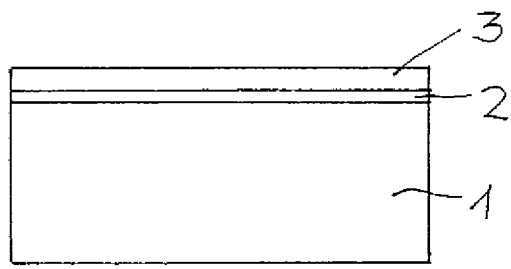

ELECTRICAL PLUG CONTACTS AND A SEMI-FINISHED PRODUCT FOR THE PRODUCTION THEREOF

BACKGROUND OF THE INVENTION

1. Field of the Invention

The present invention relates to electric plug-in contacts for plug-in connectors in electric DC wiring systems operated at a nominal voltage, in which electric arcing may occur, and to a semi-finished product for the production of such plugs as defined in the preamble of Claim 1. Especially, the invention relates to plug-in contacts intended for use in automobiles.

2. Description of Related Art

Today, passenger cars generally are equipped with electric wiring systems that operate at a nominal voltage of 14 V. Plug-in contacts in plug-in connectors intended for that use usually consist of a main body, made from copper, a copper-based alloy such as CuNiSi or stainless steel which provide the required electric conductivity and spring properties so ensure safe contact-making by the plug-in connector. In order to guarantee stable electric contact-making properties even in a corrosive atmosphere, it has been known to provide the main bodies of the plug-in contacts, or their semi-fished products, with a hard gold layer applied by galvanic deposition, or with a pure silver layer or a tin layer. Tin and tin alloy layers are frequently applied also using a fire-tinning process. Given the marginal conditions required heretofore (use in air at a nominal voltage of 14 V and a maximum ambient temperature of 150° Celsius—in which connection it must be considered that the temperature of the plug-in connector being heated by the current may further rise by 30° Celsius above ambient temperature) it has been possible in this way to achieve a sufficient degree of wear resistance when plugging-in and pulling off the male and female plug-in contacts.

It is planned by automobile manufacturers for the future to increase the voltage of passenger car wiring systems to 42 Volts. In direct-voltage electric wiring systems, operating at a nominal voltage of 42 V, plugging-in and pulling off plug-in connectors under load may give rise to electric arcing with the result that the plug-in contact or even the vehicle may catch fire. In addition, shocks occurring during operation of the vehicle may cause micro-interruptions between the plug-in contacts in the plug-in connectors, which likewise may give rise to electric arcs. Whether or not an electric arc actually strikes across a gap between two contact surfaces, due to vibration or under the effect of a plug being plugged in or pulled off, depends not only on the electric voltage available but also on whether a capacitive load or an inductive load is being separated and on the particular material making up the contact surfaces concerned. Generally, all materials have a specific minimum voltage, determined by physical conditions, which must be reached before charge carriers come off the contact surface to feed the electric arc. The element having the highest arc voltage is carbon with an arc voltage of 20 Volts; metals all have arc voltages of between 12 Volts and 16 Volts. In passenger car wiring systems, operating at a nominal voltage of 14 Volts, separation of a plug-in connector under load will not yet lead to a permanently firing arc as the load impedance in the previously closed circuit leads to a voltage drop so that the required arc-firing voltage will not be reached in the gap formed between the contact surfaces concerned when separating a plug-in connector. Consequently, the contact surfaces of today's passenger cars are not designed for loads at which electric arcing may occur.

The problem that in the case of 42 V automotive wiring systems electric arcing may occur when separating electric plug-in contacts, which may lead to serious damage and even to the vehicle catching fire and which are likely to jeopardize the safety of the passengers, is generally known in the art. Persons skilled in the art are also aware of the fact that the entire electric wiring system, and its components, will have to be redesigned to meet the requirements of a nominal voltage of 42 Volts and that considerable development effort will also have to be made for redesigning plug-in connectors and switchgear, see for example the paper by Thomas J. Schopf, "Electrical Contacts in the Automotive 42 VDC PowerNet", Proceedings of the 21.sup.st International Conference on Electrical Contacts, 09 to 12.09.2002, Zurich, pp. 43 6o 55, especially p. 52. That paper suggests to investigate means for the quenching of arcs.

The paper by N. Ben Jamaa et al. "Short Arc Duration Laws and Distribution at Low Current (<1A) and Voltage (14-42 VDC)", Proceedings of 20.sup.th International Conference on Electrical Contacts 19 to 23.06.2000, Stockholm, pp. 379 to 383, reports on investigations made regarding the arc duration on contact surfaces made from Ag, Au, Cu, Pd, Sn, Ni and steel, where palladium showed the shortest and tin showed the longest arc duration. However, palladium is very expensive which makes its use for plug-in connectors in the automotive field uneconomical. As mentioned before, the other materials are known as contact surfaces for plug-in connectors in 14V automotive power systems in modern vehicles, but are insufficiently qualified for use in 42V power systems.

Another problem is seen in the fact that electric arcs occurring in 42V automotive power systems may alter the contact surface and lead to a higher contact transfer resistance and, thus, to undesirable heating-up of the contact, under certain circumstances even to welding of plug-in contacts so that the latter can no longer be separated.

SUMMARY OF THE INVENTION

Now, it is the object of the present invention to provide electric plug-in contacts and a semi-finished product for making the same, which will show improved behaviour in known semi-finished products and plug-in contacts, designed for a nominal voltage of 14 Volts, under the stresses to be expected in 42V automotive power systems and which meet the marginal conditions listed below that have been postulated for use in 42V power systems:

On the one hand, the main body of the connectors should have a springiness which ensures reliable contact-making in electric plug-in connectors.

On the other hand, the main body should be sufficiently ductile to make it workable, especially by bending.

Plug-in-connectors made using such plug-in contacts should be capable of being repeatedly separated and joined under load without welding one to the other.

Plug-in-connectors made using such plug-in contacts should be capable of being repeatedly separated and joined without the contact transfer resistance increasing inadmissibly. Especially, the contact layer applied should not wear even after repeated separating and joining operations of the plug-in connector. It should be possible to carry out the number of plugging-in operations typical for automobiles without failure.

The plug-in contacts must be suited for use in ambient temperatures of up to 200.degree. Celsius.

The cost of the plug-in contacts and the semi-finished product for making the same must be low.

The object of the invention is achieved by a semi-finished product described herein, by a method for making it and by plug-in contacts produced by the disclosed method.

BRIEF DESCRIPTION OF THE FIGURES

FIG. 1 is a cross-section illustration of the strip-like semi-finished product in accordance with the present invention generally showing a main body, an interconnected layer, and a contact-making-layer.

DETAILED DESCRIPTION OF THE INVENTION

The invention offers considerable advantages:

By using a main body made from a non-precious material and a coating with favourable properties with respect to electric contact-making in plug-in connectors both the mechanical and the electrical requirements can be met.

By forming the coating intended to establish the electric contact on the basis of silver or a silver-based alloy, with pure silver being preferred because of its higher melting point, contact surfaces with sufficiently low contact transfer resistance and sufficiently high corrosion resistance can be obtained. A low contact transfer resistance is favourable with respect to low heating-up of the plug-in contacts in a plug-in connector. Good corrosion resistance is favourable with respect to a permanently low contact transfer resistance.

Pure silver would be unfavourable as contact-making coating with respect to the arc loading that may arise in 42V automotive power systems. It is the more surprising that even thin silver layers or layers of a silver-based alloy with small amounts of an addition selected according to the invention already have the effect to considerably improve the suitability of plug-in contacts for plug-in connectors in 42V automotive power systems.

Even thin layers composed according to the invention are still completely in place after repeated loading by arcs and do not wear by repeated pulling and plugging-in of a plug designed according to the invention.

It is further surprising that migration of components of the main body into the contact-making coating remains within narrow tolerable limits so that no re-alloying occurs even under repeated arcing. This even applies to copper from a main body containing copper.

The thin contact-making coating is sufficiently hard for use in plug-in connectors.

As the coating may be only thin, the costs for the use of rare silver are only low.

The coating may be deposited at low cost by a PVD process, especially by sputtering. This permits silver and additions that will not alloy with silver to be deposited as a finely grained dense and hard mechanical mixture. The main body remains cold enough during the deposition process so that it will not loose its predetermined hardness.

Using a reactive PVD process, compounds, especially metal oxides, may also be deposited as additions.

Preferably, the coating has a maximum thickness of 10 .mu.m. A thicker coating might improve the resistance to stretching, drawing and arcing, but in view of the limited number of drawing and stretching events practically encountered during the lifetime of a passenger car—one expects that drawing and stretching will occur on no more than 10 to 20 occasions—is would not pay off and might, on the other hand, impair the workability of the semi-finished product. Preferably, the coating is selected to have a maximum thickness of 5 .mu.m. Especially good results have been achieved with coatings having a thickness of between 0.5 mu.m and 5 mu.m.

Surprisingly, minor additions to the silver or the silver-based alloy will already be sufficient. With an addition of 0.2% by weight one already achieves a notable improvement compared with a coating of pure silver or a silver-based allow. Preferably, the non-alloyed addition should be contained in the silver or the silver-based alloy in an amount of at least 0.5% by weight, maximally 50% by weight. Most conveniently, the range of the non-alloyed addition in the coating is between 0.5% by weight and 15% by weight. Materials especially well suited as additions are tungsten, molybdenum, graphite, nickel, cobalt, metal oxides, especially tin oxide and zinc oxide, as well as tungsten carbide and molybdenum carbide. Especially well suited for purposes of the invention are refractory additions that build up in fine distribution in the grain boundaries of the silver matrix, such as tungsten and molybdenum.

Suited for use as the main body are all non-precious alloys known in the prior art for electric plug-in contacts, the materials of the present invention being particularly well suited.

Preferably, the semi-finished product consists of a strip that can be continuously coated by a continuous process. Especially, the semi-finished product may also be a pre-punched strip, which likewise can be continuously coated, especially by a dry and cold PVD process. If pre-punched strips are used, where the contours of the plug-in contacts to be formed have been defined by the pre-punching operation, the plug-in contacts can then be economically formed from the strip by a simple separating and bending process.

Depositing the coating by a PVD process, especially by sputtering, provides the additional advantage that the composition of the coating can be altered by modification of the deposition conditions, and this even continuously during the deposition process. Thus, it is possible to give the coating a gradient regarding the non-alloyed addition that will not form an alloy with silver or the silver alloy, for optimising the mechanical and electric properties of the contact-making coating.

In order to maintain the composition and, thus, the properties of the contact-making coating over a long period of time, it may further be of advantage to provide an intermediate layer between the main body and the contact-making coating which inhibits diffusion of components of the main body material into the contact-making coating on the contact surface. Such an intermediate layer may consist, for example, of a few .mu.m of nickel. A few .mu.m of silver as an intermediate layer are likewise suited. Silver should be the material of choice especially when a semi-finished product according to the invention is to be bent to radii so narrow that a nickel layer would break. Especially well suited as layer thicknesses for the intermediate layer are 1 .mu.m to 5 .mu.m, especially 2 .mu.m.+-.0.5 .mu.m.

For testing the resistance to arcing, a number of plug-in contacts made from copper and provided with a layer of 2 .mu.m thickness of silver with a tungsten content of 4% by weight, were separated 20 times at a direct voltage of 42V, under a load current of 1.5 A and an inductance of 1.75 mH. After 20 separating operations, with an arc firing during each operation, the coating was not burnt off, not even in the area of the arc base points, but was still completely in place over the full surface, though it was roughened by melting-up processes. An analysis of the composition of the contact-making coating after the 20 arc exposures revealed a low copper content of maximally 1.5% by weight in the area of the arc base points—a value that can be very well tolerated.

The attached drawing shows a cross-section through a strip-like semi-finished product—greatly enlarged and not true to scale—illustrating the structure of a semi-finished product according to the invention with a main body 1, of 0.5 mm thickness for example, consisting of a spring alloy based on copper, for example copper with 3% nickel and 0.5% Si (material No. C7025 according to CDA) and on top, as diffusion inhibiting intermediate layer 2, a nickel layer of 2 .mu.m thickness that can be deposited galvanically or by a PVD process. On top of the nickel layer 2, there can be seen as contact-making layer 3 a silver layer of 4 .mu.m thickness with a tungsten content of 5% by weight, which have been sputtered jointly to form a finely distributed mechanical mixture.

The invention claimed is:

1. Semi-finished product for making plug-in contact in plug-in connection for electric DC power system in motor vehicles which are operated at a normal voltage at which electric arcing may occur, said semi-finished product comprising:
    an electrically conductive main body made of a non-precious metallic material;
    a contact-making coating made of a material more precious than the non-precious metallic main body material, said contact making coating having a thickness of 0.5 μm to 5 μm of silver or of a silver-based alloy with tungsten or molybdenum in an amount between 0.5%-15% by weight and, the tungsten or molybdenum not forming an alloy with silver or silver-based alloy but being disposed in fine distribution in grain boundaries of the silver or silver based alloy, wherein the concentration of the silver or silver-alloy coating is lower at the surface of the coating than in the deeper region of the coating; and
    a diffusion inhibiting intermediate layer disposed between the main body and the contact making coating.

2. Semi-finished product for making plug-in contacts in plug-in connectors for electric DC power systems in motor vehicles which are operated at a nominal voltage at which electric arcing may occur, said semi-finished product comprising:
    an electrically conductive main body made of a non-precious metallic material;
    a contact-making coating made of a material more precious than the non-precious main body material, said contact making coating having a thickness of 0.5 μm to 5 μm of silver or of a silver-based alloy with an addition forming a precipitation alloy by way of a build-up in fine distribution in grain boundaries of the silver, said precipitation alloy having a higher melting point than silver, the addition being tungsten or molybdenum in an amount of at least 0.2 percent by weight, the contact making coating being deposited in a gradient manner wherein a concentration of the silver or silver based alloy is lower at a surface of the coating then in deeper regions of the coating; and
    a diffusion inhibiting intermediate layer disposed between the main body and the contact making coating.

3. Semi-finished product for making plug-in contacts in plug-in connectors for electric DC power systems in motor vehicles which are operated at a nominal voltage at which electric arcing may occur, as defined in claim 2 wherein the addition is deposited by a sputtering PVD process.

4. The semi-finished product as defined in claim 1, wherein the product is a strip.

5. The semi-finished product as defined in claim 4, wherein the strip is pre-punched.

6. The semi-finished product as defined in claim 1, wherein the intermediate layer consists of silver or nickel.

7. Plug-in contacts for electric plug-in connectors made from a semi-finished product according to claim 1.

* * * * *